United States Patent
Hu

(10) Patent No.: US 11,477,114 B2
(45) Date of Patent: Oct. 18, 2022

(54) PACKET FORWARDING METHOD AND APPARATUS

(71) Applicant: Huawei Technologies Co., Ltd., Shenzhen (CN)

(72) Inventor: Zhibo Hu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 106 days.

(21) Appl. No.: 17/068,409

(22) Filed: Oct. 12, 2020

(65) Prior Publication Data

US 2021/0029022 A1    Jan. 28, 2021

Related U.S. Application Data

(63) Continuation of application No. PCT/CN2019/079888, filed on Mar. 27, 2019.

(30) Foreign Application Priority Data

Apr. 13, 2018    (CN) .......................... 201810333853.5

(51) Int. Cl.
*H04L 45/00* (2022.01)
*H04L 45/18* (2022.01)
*H04L 45/28* (2022.01)

(52) U.S. Cl.
CPC .............. *H04L 45/22* (2013.01); *H04L 45/18* (2013.01); *H04L 45/28* (2013.01); *H04L 45/34* (2013.01)

(58) Field of Classification Search
CPC combination set(s) only.
See application file for complete search history.

(56) References Cited

U.S. PATENT DOCUMENTS

2002/0060985 A1    5/2002    Lee et al.
2015/0078378 A1*   3/2015    Wijnands ................ H04L 45/74
                                                                370/390
(Continued)

FOREIGN PATENT DOCUMENTS

CN    101409905 A    4/2009
CN    103023771 A    4/2013
(Continued)

OTHER PUBLICATIONS

S. Hegde et al., "Node Protection for SR-TE Paths; draft-hegde-spring-node-protection-for-sr-te-paths-02," IETF, total 16 pages (Oct. 30, 2017).
(Continued)

*Primary Examiner* — Xavier S Wong
(74) *Attorney, Agent, or Firm* — Leydig, Voit & Mayer, Ltd.

(57) ABSTRACT

A packet forwarding method and apparatus are provided, and pertain to the field of communications technologies. The method includes: determining, by a first node, information about a loop-free path from the first node to a second node, where the first node and the second node are a pair of nodes having an anycast route; and when the first node receives a packet to be sent to a third node, if a link from the first node to the third node is faulty, forwarding, by the first node, the packet to the second node based on the information about the loop-free path, so as to forward the packet to the third node through the second node. According to this application, a success rate of packet sending can be improved.

15 Claims, 7 Drawing Sheets

(56) References Cited

U.S. PATENT DOCUMENTS

| | | | |
|---|---|---|---|
| 2015/0113050 A1 | 4/2015 | Stahl | |
| 2016/0028586 A1* | 1/2016 | Blair | H04B 10/27 398/45 |
| 2017/0288948 A1 | 10/2017 | Singh et al. | |
| 2018/0077051 A1* | 3/2018 | Nainar | H04L 45/28 |

FOREIGN PATENT DOCUMENTS

| | | |
|---|---|---|
| CN | 103179052 A | 6/2013 |
| CN | 103441871 A | 12/2013 |
| CN | 106658378 A | 5/2017 |
| CN | 107276784 A | 10/2017 |
| CN | 107797769 A | 3/2018 |

OTHER PUBLICATIONS

Chen et al., "Anycast-SID FRR for Segment Routing Network; draft-chen-spring-segemt-routing-anycast-frr-00," IETF, total 6 pages (Dec. 5, 2017).

C. Filsfils et al., "Segment Routing Use Cases; draft-filsfils-rtgwg-segment-routing-use-cases-01," IETF, total 46 pages (Jul. 14, 2013).

* cited by examiner

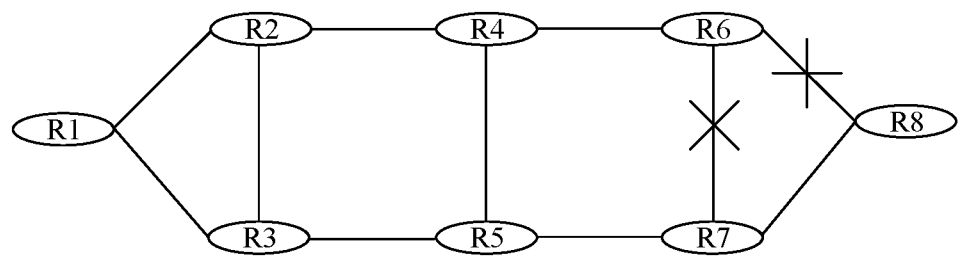
FIG. 1
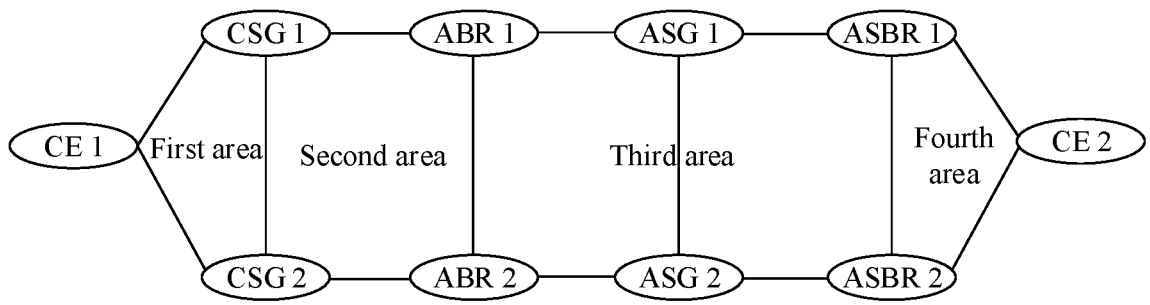
FIG. 2
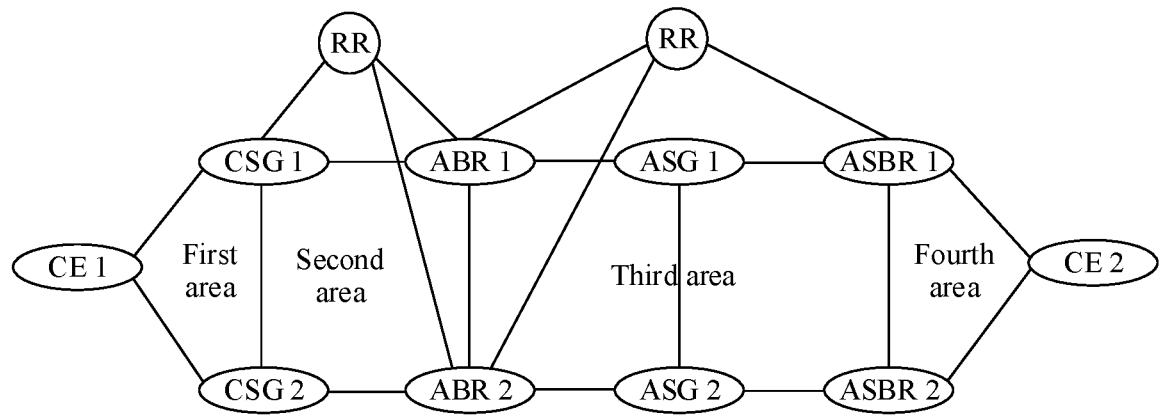
FIG. 3
| Destination address | Private network label | Next hop |
|---|---|---|
| Address of CE 1 | Private network label allocated by a CSG 1 to CE 1 | Address of CE 1 |
FIG. 4a

| Destination address | Private network label | Next hop |
|---|---|---|
| Address of CE 1 | Private network label allocated by a CSG 1 to CE 1 | IP address of a CSG 1 |

FIG. 4b

| Destination address | Private network label | Next hop |
|---|---|---|
| Address of CE 1 | Private network label allocated by a CSG 1 to CE 1 | IP address of an ABR 1 |

FIG. 4c

| Destination address | Private network label | Next hop |
|---|---|---|
| Address of CE 1 | Private network label allocated by a CSG 1 to CE 1 | IP address of an ABR 2 |

FIG. 4d

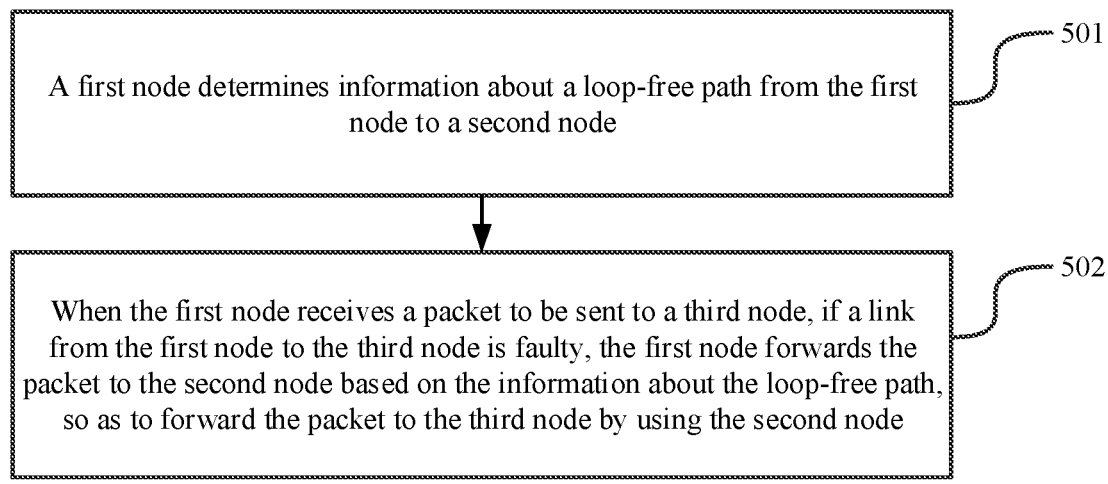

FIG. 5

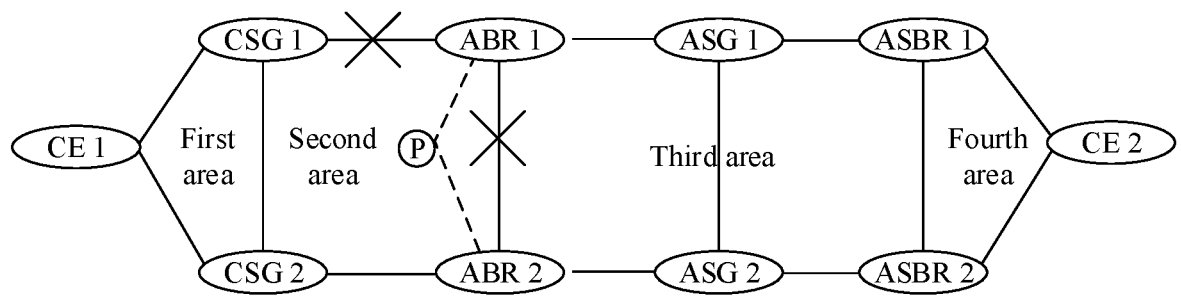
FIG. 6
| Destination address | Private network label | Next hop |
|---|---|---|
| Address of CE 1 | Private network label allocated by a CSG 1 to CE 1 | Address of an ABR 2 (Primary) |
| Address of CE 1 | Private network label allocated by a CSG 1 to CE 1 | Loop-free path information (Secondary) |
FIG. 7
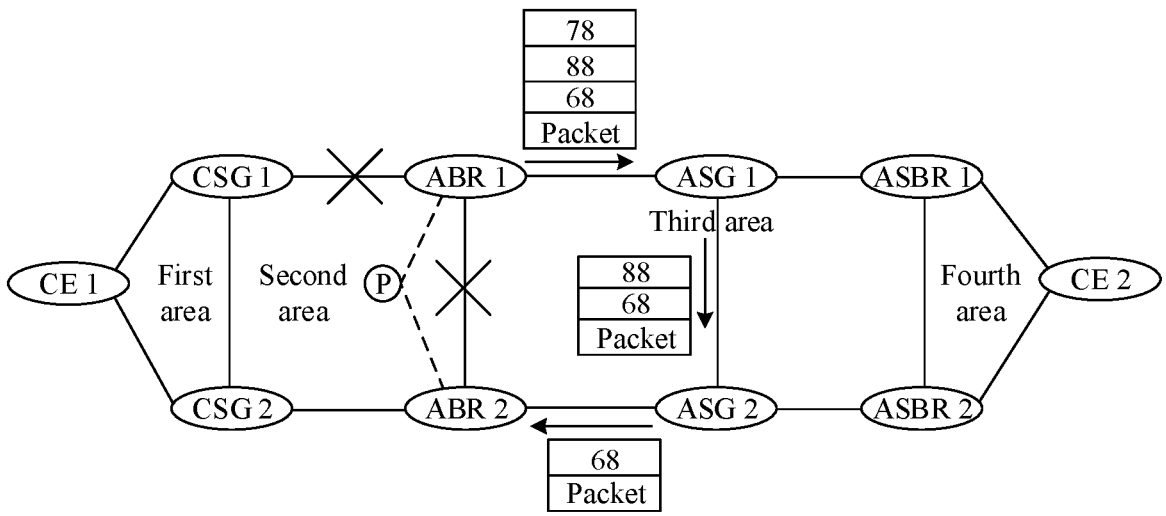
FIG. 8

US 11,477,114 B2

PACKET FORWARDING METHOD AND APPARATUS

CROSS-REFERENCE TO RELATED APPLICATIONS

This application is a continuation of International Application No. PCT/CN2019/079888, filed on Mar. 27, 2019, which claims priority to Chinese Patent Application No. 201810333853.5, filed on Apr. 13, 2018. The disclosures of the aforementioned applications are hereby incorporated by reference in their entireties.

TECHNICAL FIELD

This application relates to the field of communications technologies, and in particular, to a packet forwarding method and apparatus.

BACKGROUND

Segment routing (SR) is a tunnel forwarding mechanism based on source routing. During packet forwarding, a segment identifier (SID) of a destination node may be encapsulated on a source node in advance, or an SID and/or a link identifier of a node through which a packet passes may be encapsulated on the source node. When the packet passes through the node, the node may forward the packet based on the SID and/or the link identifier in the packet.

In a related technology, because of reliability of a solution in which anycast is used for networking, two nodes (A and B) that are completely the same are configured with a same IP address and a same SID during networking, and the node A and the node B form a pair of nodes having an anycast route. In a subsequent use process, after a link from the node A to a next-hop node is faulty, the node B may be used to send a packet to the next-hop node for packet forwarding.

In this way, when the node A sends a packet to the node B, the node A may encapsulate an address of the node B in the packet, and the node A may send an encapsulated packet to a directly connected node C. The node C may calculate a minimum path cost of a path to the node B based on the address of the node B encapsulated in the packet, to determine an egress port. Because an address of the node A is the same as the address of the node B, if a cost of a path from the node C to the node A is smaller, the packet is forwarded to the node A. Consequently, a loop occurs during packet forwarding, and the packet fails to be sent.

SUMMARY

To resolve a problem of a packet forwarding failure, embodiments of the present application provide a packet forwarding method and apparatus. Certain technical solutions are as follows.

According to a first aspect, a packet forwarding method is provided, where the method includes:

determining, by a first node, information about a loop-free path from the first node to a second node, where the first node and the second node are a pair of nodes having an anycast route; and when the first node receives a packet to be sent to a third node, if a link from the first node to the third node is faulty, forwarding, by the first node, the packet to the second node based on the information about the loop-free path, so as to forward the packet to the third node through the second node.

In a solution shown in an embodiment of the present application, when the first node and the second node are the pair of nodes having an anycast route, the first node may determine the information about the loop-free path from the first node to the second node. When the first node has the packet to be sent to the third node, and the link between the first node and the third node is faulty, the first node may send the packet to the second node based on the information about the loop-free path, and the second node may send the packet to the third node. In this way, the packet may be sent to the third node, and no loop is formed.

In a possible manner, the first node determines that the information about the loop-free path is information about a primary route from the first node to the second node.

In the solution shown in this embodiment of the present application, regardless of whether there is a direct link between the first node and the second node, the first node may determine that the information about the loop-free path from the first node to the second node is the information about the primary route from the first node to the second node. In this way, regardless of a status of a link between the first node and the second node, a packet that the first node wants to send to the second node may be sent to the second node, and no loop occurs, so that a success rate of packet sending is improved.

In a possible manner, if there is a direct link between the first node and the second node, the first node determines that the information about the loop-free path is information about a secondary route from the first node to the second node; and when the first node receives the packet to be sent to the third node, if the link from the first node to the third node is faulty, and the direct link between the first node and the second node is faulty, the first node forwards the packet to the second node based on the information about the loop-free path.

In the solution shown in this embodiment of the present application, when there is the direct link between the first node and the second node, the first node may determine that the information about the loop-free path from the first node to the second node is the information about the secondary route from the first node to the second node. In this way, when the direct link between the first node and the second node is not faulty, because a cost of the path from the first node to the second node is smaller, the first node may send the packet to the second node. After the direct link between the first node and the second node is faulty, the first node may send the packet to the second node by using the information about the loop-free path from the first node to the second node. In this way, the packet that the first node wants to send to the second node may be sent to the second node, and no loop occurs, so that a success rate of packet sending is improved.

In a possible manner, the first node adds a virtual node to network topology information, and separately sets virtual links between the virtual node and each of the first node and the second node, where an address of the virtual node is the same as an address of the first node. The first node determines the information about the loop-free path from the first node to the second node based on the first node, the virtual node, and network topology information obtained after the virtual node and the virtual links are added.

In the solution shown in this embodiment of the present application, the first node may add the virtual node to the network topology information stored in the first node, construct the virtual link from the virtual node to the first node, the virtual link from the first node to the virtual node, and construct the virtual link from the virtual node to the second node and the virtual link from the second node to the virtual node. Then, and information about a loop-free path from the first node to the virtual node is determined by using the network topology information added with the virtual node based on the first node used as a start node and the virtual node used as a destination node. In this way, because the virtual node cannot be used to transmit a packet, the packet is not sent to the virtual node, so that the information about the loop-free path from the first node to the virtual node is the information about the loop-free path from the first node to the second node. In this way, the information about the loop-free path from the first node to the second node may be quickly determined based on the virtual node.

In a possible manner, the address of the first node includes a first SID and a second SID, an address of the second node includes the first SID and the second SID, a first path cost difference corresponding to the first SID is equal to a second path cost difference corresponding to the second SID, the first path cost difference is a difference at the first SID between a cost of the path from the first node to the virtual node and a cost of the path from the second node to the virtual node, and the second path cost difference is a difference at the second SID between a cost of the path from the first node to the virtual node and a cost of the path from the second node to the virtual node.

In the solution shown in this embodiment of the present application, during networking, the second node sends route advertisement information to the first node, where the route advertisement information carries the first SID and the second SID of the second node, and carries a path cost pre-configured at the first SID and a path cost pre-configured at the second SID. After the first node receives the route advertisement information sent by the second node, the first node may obtain SIDs of the first node. If the SIDs of the first node are also the first SID and the second SID, the first node obtains a path cost of the first node pre-configured at the first SID, and obtains a path cost of the first node pre-configured at the second SID. Then, a difference at the first SID between the pre-configured path cost corresponding to the first node and the pre-configured path cost corresponding to the second node is calculated to obtain the first path cost difference, and a difference at the second SID between the pre-configured path cost corresponding to the first node and the pre-configured path cost corresponding to the second node is calculated to obtain the second path cost difference. If the first path cost difference is equal to the second path cost difference, one virtual node may be disposed corresponding to the first node and the second node. Then, a cost of the path from the first node to the virtual node may be set to the pre-configured path cost at the first SID corresponding to the first node, and a cost of the path from the second node to the virtual node may be set to the pre-configured path cost at the first SID corresponding to the second node. Alternatively, a cost of the path from the first node to the virtual node is set to the pre-configured path cost at the second SID corresponding to the first node, and a cost of the path from the second node to the virtual node may be set to the pre-configured path cost at the second SID corresponding to the second node. In this way, it may be met that the first path cost difference corresponding to the first SID is equal to the second path cost difference corresponding to the second SID. The first path cost difference is the difference at the first SID between the cost of the path from the first node to the virtual node and the cost of the path from the second node to the virtual node. The second path cost difference is the difference at the second SID between the cost of the path from the first node to the virtual node and the cost of the path from the second node to the virtual node. In this way, when path costs are being calculated, when the first SID and the second SID are used, adding an equal value to both the cost of the path from the first node to the virtual node and the cost of the path from the second node to the virtual node does not affect selection of an optimal path based on the path costs.

In a possible manner, the cost of the path from the virtual node to the first node and the cost of the path from the virtual node to the second node are preset values greater than a preset threshold.

In the solution shown in this embodiment of the present application, after the first node constructs the virtual link from the virtual node to the first node, the first node may obtain the pre-stored preset value, and then in the network topology information, set the cost of the path from the virtual node to the first node to the preset value. In addition, after the first node constructs the virtual link from the virtual node to the second node, the first node may obtain the pre-stored preset value, and then in the network topology information, set the cost of the path from the virtual node to the second node to the preset value. In this way, because the preset value is the maximum value, during path computation, a selected path does not include the path from the virtual node to the first node or the path from the virtual node to the second node. This can prevent the packet from being sent to the virtual node.

In a possible manner, the first node receives the route advertisement information sent by the second node, where the route advertisement information carries the segment identifier SID of the second node. If the SID of the first node is the same as the SID of the second node, the first node determines the information about the loop-free path from the first node to the second node.

In the solution shown in this embodiment of the present application, the first node receives the route advertisement information sent by the second node, where the route advertisement information carries the SID of the second node. If the SID of the first node is the same as the SID of the second node, it indicates that the first node and the second node are the pair of nodes having an anycast route, and the first node may determine the information about the loop-free path from the first node to the second node. In this way, when the SID of the first node is the same as that of the second node, the first node may determine the information about the loop-free path from the first node to the second node.

In a possible manner, the first node receives a route advertisement message sent by the third node, where the route advertisement message carries an IP address of the third node. The first node receives a route advertisement message sent by the second node, where the route advertisement message carries an IP address that is of at least one node and that is learned by the second node. If the IP address of the at least one node includes the IP address of the third node, the first node determines the information about the loop-free path from the first node to the second node.

In the solution shown in this embodiment of the present application, during networking, the third node may send the route advertisement message to the first node and the second node. After the first node receives the route advertisement message of the third node, the first node may obtain the IP address of the third node, and the second node may also obtain the IP address of the third node. Then, the second node may send the IP address of the third node to the first node by using the route advertisement message, the first node determines that the IP address sent by the second node includes the IP address of the third node, so that the first node may determine the information about the loop-free path from the first node to the second node. In this way, when the first node and the second node learn of a same IP address, the first node determines the information about the loop-free path from the first node to the second node.

In a possible manner, the first node encapsulates the information about the loop-free path in a header of the packet; and the first node forwards a packet encapsulated with the information about the loop-free path to the second node.

In the solution shown in this embodiment of the present application, the first node may encapsulate the information about the loop-free path in the packet header of the packet, and then the first node may send the encapsulated packet to the second node. The second node determines that the packet header has the address of the second node, may obtain a destination address (the address of the third node) of the packet, and sends the packet to the third node. In this way, the first node can accurately send the packet to the second node.

According to a second aspect, a first node is provided. The first node includes a processor, a transmitter, a memory, and a receiver. The processor executes an instruction to implement the packet forwarding method provided in the first aspect.

According to a third aspect, a packet forwarding apparatus is provided. The apparatus includes one or more modules, and the one or more modules execute an instruction to implement the packet forwarding method provided in the first aspect.

According to a fourth aspect, a computer-readable storage medium is provided. The computer-readable storage medium stores an instruction. When the computer-readable storage medium runs on a first node, the first node is enabled to perform the packet forwarding method provided in the first aspect.

According to a fifth aspect, a computer program product including an instruction is provided. When the computer program product runs on a first node, the first node is enabled to perform the packet forwarding method provided in the first aspect.

The technical solutions provided in the embodiments of the present application bring the following beneficial effects.

In the embodiments of the present application, when the first node and the second node are the pair of nodes having an anycast route, the first node may send the packet to the second node by using the information about the loop-free path from the first node to the second node, so that a loop is not formed when the packet is sent between the nodes having an anycast route. This improves a success rate of packet sending.

BRIEF DESCRIPTION OF DRAWINGS

FIG. 1 is a schematic diagram of packet forwarding according to an embodiment of the present application;

FIG. 2 is a schematic structural diagram of a network for packet forwarding according to an embodiment of the present application;

FIG. 3 is a schematic structural diagram of a network for packet forwarding according to an embodiment of the present application;

FIG. 4a is a schematic diagram of a private network routing table according to an embodiment of the present application;

FIG. 4b is a schematic diagram of a private network routing table according to an embodiment of the present application;

FIG. 4c is a schematic diagram of a private network routing table according to an embodiment of the present application;

FIG. 4d is a schematic diagram of a private network routing table according to an embodiment of the present application;

FIG. 5 is a schematic flowchart of a packet forwarding method according to an embodiment of the present application;

FIG. 6 is a schematic diagram of a virtual node according to an embodiment of the present application;

FIG. 7 is a schematic diagram of a private network routing table according to an embodiment of the present application;

FIG. 8 is a schematic diagram of packet forwarding according to an embodiment of the present application;

DESCRIPTION OF EMBODIMENTS

Figure 9A:
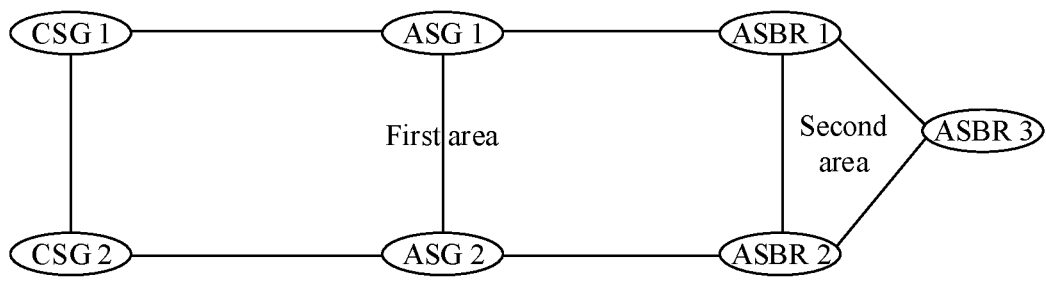
FIG. 9a is a schematic structural diagram of a network for packet forwarding according to an embodiment of the present application.

To make the objectives, technical solutions, and advantages of this application clearer, the following further describes exemplary implementations of this application in detail with reference to the accompanying drawings.

To facilitate understanding of the embodiments of the present application, the following first describes a processing process in a related technology, a system architecture and an application scenario in the embodiments of the present application, and concepts of terms in the embodiments of the present application.

In the related technology, in a network shown in FIG. 1, a node R6 and a node R7 are configured as a pair of nodes having an anycast route. When a packet is transmitted from an R1 to an R8, a forwarding path of the packet is R1-R2-R4-R6-R8. When the R6 detects that the path to the R8 is interrupted, because the R6 and the R7 are a pair of anycast nodes, the R6 encapsulates an address of the R7 in the packet. The R6 then forwards an encapsulated packet to the R7 through a direct link between the R6 and the R7. When receiving the packet, the R7 finds that the address is the address of the R7, and can check a destination address and forward the packet to the R8.

In the network shown in FIG. 1, if the direct link between the R6 and the R7 is interrupted, the R6 searches a routing table, determines, by searching the routing table, that the packet can be forwarded to the R7 by using the R4, and forwards the packet encapsulated with the address of the R7 to the R4. The R4 determines a next hop by using the address of the R7. Because an address of the R6 is the same as the address of the R7, when a cost of a path from the R4 to the R6 is smaller, the next hop determined by the R4 is the R6, and therefore the packet is forwarded to the R6. Consequently, a loop occurs during packet forwarding, and the packet fails to be sent.

The embodiments of the present application are applicable to a network using a segment routing (SR) protocol. As shown in FIG. 2, the network includes four areas: a first area, a second area, a third area, and a fourth area. The first area is adjacent to the second area, the second area is adjacent to the third area, and the third area is adjacent to the fourth area. The first area and the fourth area are border gateway protocol (BGP) areas, and the third area and the fourth area are interior gateway protocol (IGP) areas. The first area includes one piece of CE 1 (Customer Equipment), and there is a link between the CE 1 and a CSG 1. In the second area, main nodes include two cell site gateways (CSG), that is, a CSG 1 and a CSG 2, which may be considered as border nodes of the IGP area, and two area border routers (ABR), that is, an ABR 1 and an ABR 2, where the ABR 1 and the ABR 2 are a pair of anycast nodes used for redundancy protection. There is a link between the CSG 1 and the ABR 1, there is a link between the CSG 1 and the CSG 2, there is a link between the CSG 2 and the ABR 2, and there is a link between the ABR 1 and the ABR 2. In the third area, main nodes include two autonomous system border routers (ASBR), that is, an ASBR 1 and an ASBR 2, and two aggregation site gateways (ASG), that is, an ASG 1 and an ASG 2. There is a link between the ABR 1 and the ASG 1, there is a link between the ABR 2 and the ASG 2, there is a link between the ASBR 1 and the ASG 1, there is a link between the ASBR 2 and the ASG 2, and there is a link between the ASG 1 and the ASG 2. In the fourth area, there is one CE 2, there is a link between the CE 2 and the ASBR 1, and there is a link between the CE 2 and the ASBR 2.

In addition, as shown in FIG. 3, the second area and the third area further separately correspond to a route reflector (RR).

A virtual node is a node that is virtualized in a network topology, is used only for calculating loop-free path information, and is not used to transmit a packet.

A first node, a second node, and a third node are network devices that perform a routing and forwarding function, for example, devices such as a router and a switch.

In the embodiments of the present application, the solution is described in detail by using an example in which the first node is the ABR 1, the second node is the ABR 2, and the third node is the CSG 1. Before implementation, a processing process of establishing a private network routing table on the CSG 1, the ABR 1, the ABR 2, and the ASBR 1 is first described. After the CE 1 sends an address of the CE 1 to the CSG 1 and the CSG 1 receives the address, the CSG 1 may allocate a private network label to CE 1, and record a private network routing table corresponding to a port receiving a packet from the CE 1. As shown in FIG. 4a, the private network routing table includes the address of the CE 1, a next hop (the address of the CE 1) and the private network label. Then, the CSG 1 sends the private network label, the address of the CE 1, and an address of the CSG 1 to the route reflector in the second area. The route reflector may send the private network label, the address of the CE 1, and the address of the CSG 1 to the ABR 1 and the ABR 2. The ABR 1 and the ABR 2 may record a private network routing table. As shown in FIG. 4b, the private network routing table includes the address of the CE 1, a next hop (the address of the CSG 1) and the private network label. Next, the ABR 1 and the ABR 2 may send the private network label, the address of the CE 1, and an address of each of the ABR 1 and the ABR 2 to the route reflector in the third area. The route reflector may send the private network label, the address of the CE 1, and the address of the ABR 1 to the ASBR 1. The ASBR 1 may record a private network routing table. As shown in FIG. 4c, the private network routing table includes the address of CE 1, a next hop (the address of the ABR 1 or the address of the ABR 2), and the private network label. In addition, the ABR 2 may send the address of the ABR 2, the address of the CE 1, and the private network label to the ABR 1 by using the route reflector of the second area. After receiving the address of the ABR 2, the address of the CE 1, and the private network label, the ABR 1 also records a private network routing table. As shown in FIG. 4d, the private network routing table includes the address of the CE 1, a next hop (the address of the ABR 2), and the private network label. In conclusion, the ABR 1 stores two next hops corresponding to the private network label. Similarly, the ABR 2 stores two next hops for the same private network label. The principle is the same as that described above. It should be noted that the address of the CE 1 is a destination IP address carried in an IP packet header, and the sent information such as the private network label and the address may be carried in a route advertisement message.

In addition, a node in the first area may further establish a public network routing table of their own area. The public network routing table includes routing information of all nodes in the first area. Similarly, a node in the second area may further establish a public network routing table of their own area. A method for establishing the public network routing table is the same as the process in the prior art, and is not further described herein.

As shown in FIG. 5, when the first node is the ABR 1, the second node is the ABR 2, the third node is the CSG 1, and an execution body is the first node, a processing procedure of a packet forwarding method may be as follows.

Step 501: The first node determines information about a loop-free path from the first node to the second node.

The first node and the second node are a pair of nodes having an anycast route. The information about the loop-free path means that when the first node uses the information about the loop-free path to forward a packet to the second node, a path for forwarding the packet is not a loop.

During implementation, in the foregoing network networking, the first node may determine the information about the loop-free path from the first node to the second node by using network topology information stored in the first node. Alternatively, the information about the loop-free path from the first node to the second node is determined by using the following virtual node, and corresponding processing in step 501 may be as follows:

The first node adds a virtual node to network topology information, and separately sets virtual links between the virtual node and each of the first node and the second node, where an address of the virtual node is the same as an address of the first node. The first node determines the information about the loop-free path from the first node to the second node based on the first node, the virtual node, and network topology information obtained after the virtual node and the virtual links are added.

During implementation, each node in each area of a network correspondingly stores network topology information of the area of each node. In this way, a border node or an edge node stores network topology information of two areas to which the border node or the edge node belongs. For example, the ABR 1 stores network topology information of the second area and the third area, and the ABR 2 also stores the network topology information of the second area and the third area.

The first node may add a virtual node to the network topology information stored by the first node, where an address of the virtual node is the same as the address of the first node and an address of the second node. In addition, the first node may set virtual links between the virtual node and each of the first node and the first node. There are two virtual links between the virtual node and the first node. One virtual link is a link from the first node to the virtual node, and the other virtual link is a link from the virtual node to the first node. Similarly, there are also two virtual links between the virtual node and the second node. One virtual link is a link from the second node to the virtual node, and the other virtual link is a link from the virtual node to the second node. For example, as shown in FIG. 6, P is the virtual node, a dashed line is the virtual link, and only one virtual link is shown in the figure.

After the first node adds the virtual node to the network topology information of the first node, it is equivalent to that the first node and the second node are virtualized into one virtual node, and only the virtual node publishes the address of each of the first node and the second node. The first node may input the virtual node as a destination node, the first node as a start node, and the stored network topology information into a preset loop-free path computation algorithm. Information about a loop-free path from the first node to the virtual node may be output. Because the virtual node is not actually used to transmit a packet, in other words, the second node does not send the packet to the virtual node, the determined loop-free path information is actually the information about the loop-free path from the first node to the second node. Then, the information about the loop-free path from the first node to the virtual node is stored as the information about the loop-free path from the first node to the second node.

For example, the first node is the ABR 1, the second node is the ABR 2, the third node is the CSG 1, and the virtual node is P. Information about a loop-free alternate path may be determined as: an SID of the ASG 1—an SID of the ASG 2—an SID of the ABR 2, or an SID of the ASG 1—a label of a link from the ASG 1 to the ASG 2—an SID of the ABR 2.

It should be noted that the loop-free path computation algorithm may be a topology independent loop-free alternate (TI-LFA) algorithm. In the stored network topology information used for calculating the information about the loop-free path, the first node and the second node are virtualized into one virtual node, which is equivalent to that only one node publishes the address of the first node. For example, the address of each of the first node and the second node is 1.1.1.1, and in the network topology information, only the address of the virtual node is 1.1.1.1.

Optionally, after determining the information about the loop-free path to the second node, the first node may determine that the information about the loop-free path is information about a primary route from the first node to the second node.

During implementation, regardless of whether there is a direct link between the first node and the second node (the direct link is a link that is between the first node and the second node and on which there is no other node), the first node may store the information about the loop-free path as the information about the primary route from the first node to the second node. In this way, when the first node forwards a packet to the second node, the information about the loop-free path may be used for forwarding.

In addition, the information about the loop-free path may be stored as the next hop in the private network routing table stored by the first node in FIG. 4*d*, in other words, the address of the ABR 2 is replaced with the information about the loop-free path.

Optionally, after determining the information about the loop-free path to the second node, the first node may determine that the information about the loop-free path is information about a secondary route from the first node to the second node. Corresponding processing may be as follows.

If there is a direct link between the first node and the second node, the first node determines that the information about the loop-free path is the information about the secondary route from the first node to the second node.

During implementation, after the first node determines the information about the loop-free path to the second node, if there is the direct link between the first node and the second node, the information about the loop-free path may be stored as the information about the secondary route from the first node to the second node. In this way, when the first node forwards a packet to the second node, because a path cost of the direct link between the first node and the second node is lower, the direct link from the first node to the second node may be first used for forwarding, after the direct link between the first node and the second node is faulty, the information about the loop-free path may be used for forwarding.

In addition, as shown in FIG. 7, the next hop of the address of the ABR 2 in FIG. 4*d* may be used as the primary routing information, and a next hop of the information about the loop-free path may be used as the secondary routing information.

Optionally, when there are a plurality of SIDs of the first node and the second node, a path cost of the virtual node needs to meet the following condition:

The address of the first node includes a first SID and a second SID, and the address of the second node includes the first SID and the second SID. A first path cost difference corresponding to the first SID is equal to a second path cost difference corresponding to the second SID. The first path cost difference is a difference at the first SID between a cost of the path from the first node to the virtual node and a cost of the path from the second node to the virtual node. The second path cost difference is a difference at the second SID between a cost of the path from the first node to the virtual node and a cost of the path from the second node to the virtual node.

During implementation, because the first node is a node in the IGP area, the first node has an IP address and an SID. The address of the first node may include the first SID and the second SID, and the address of the second node may also include the first SID and the second SID. During networking, the second node sends route advertisement information to the first node, where the route advertisement information carries the first SID and the second SID of the second node, and carries a path cost pre-configured at the first SID and a path cost pre-configured at the second SID. After the first node receives the route advertisement information sent by the second node, the first node may obtain SIDs of the first node. If the SIDs of the first node are also the first SID and the second SID, the first node obtains a path cost of the first node pre-configured at the first SID, and obtains a path cost of the first node pre-configured at the second SID. Then, a difference at the first SID between the pre-configured path cost corresponding to the first node and the pre-configured path cost corresponding to the second node is calculated to obtain the first path cost difference, and a difference at the second SID between the pre-configured path cost corresponding to the first node and the pre-configured path cost corresponding to the second node is calculated to obtain the second path cost difference. If the first path cost difference is equal to the second path cost difference, one virtual node may be disposed corresponding to the first node and the second node.

Then, a cost of the path from the first node to the virtual node may be set to the pre-configured path cost at the first SID corresponding to the first node, and a cost of the path from the second node to the virtual node may be set to the pre-configured path cost at the first SID corresponding to the second node. Alternatively, a cost of the path from the first node to the virtual node is set to the pre-configured path cost at the second SID corresponding to the first node, and a cost of the path from the second node to the virtual node may be set to the pre-configured path cost at the second SID corresponding to the second node. In this way, it may be met that the first path cost difference corresponding to the first SID is equal to the second path cost difference corresponding to the second SID. The first path cost difference is the difference at the first SID between the cost of the path from the first node to the virtual node and the cost of the path from the second node to the virtual node. The second path cost difference is the difference at the second SID between the cost of the path from the first node to the virtual node and the cost of the path from the second node to the virtual node.

For example, the first SID of the first node and the second node is 68, and the second SID is 78. At the first SID, the pre-configured path cost corresponding to the first node is 5, the pre-configured path cost corresponding to the second node is 10, and the obtained first path cost difference is −5. At the second SID, the pre-configured path cost corresponding to the first node is 15, the pre-configured path cost corresponding to the second node is 20, and the obtained second path cost difference is −5. In this way, the first node and the second node can be virtualized into one virtual node.

For another example, if the first SID of the first node and the second node is 68, the second SID is 78, and SIDs of the third node are 68 and 88. In this way, the first node, the second node, and the third node cannot be virtualized into one virtual node. For another example, at the first SID, the pre-configured path cost corresponding to the first node is 5, the pre-configured path cost corresponding to the second node is 10, and the first path cost difference is −5. At the second SID, the pre-configured path cost corresponding to the first node is 10, the pre-configured path cost corresponding to the second node is 20, and the second path cost difference is −10. The first path cost difference is different from the second path cost difference. Therefore, the first node and the second node cannot be virtualized into one virtual node.

It should be noted that the first node and the second node can be virtualized into one virtual node only when a condition that the first path cost difference is equal to the second path cost difference is met. This is because when path costs are being calculated, when the first SID and the second SID are used, adding an equal value to both the cost of the path from the first node to the virtual node and the cost of the path from the second node to the virtual node does not affect selection of an optimal path based on the path costs.

Optionally, in order to avoid impact from the virtual node on path computation, the cost of the path from the virtual node to each of the first node and the second node may be set to a relatively large value, and corresponding description may be as follows.

The cost of the path from the virtual node to the first node and the cost of the path from the virtual node to the second node are preset values greater than a preset threshold.

The preset value may be preset by a person skilled in the art, and is stored in the first node. The preset value is greater than the preset threshold, and the preset value is a maximum value.

During implementation, after the first node constructs the virtual link from the virtual node to the first node, the first node may obtain the pre-stored preset value, and then in the network topology information, set the cost of the path from the virtual node to the first node to the preset value. In addition, after the first node constructs the virtual link from the virtual node to the second node, the first node may obtain the pre-stored preset value, and then in the network topology information, set the cost of the path from the virtual node to the second node to the preset value.

In this way, because the preset value is the maximum value, during path computation, a selected path does not include the path from the virtual node to the first node or the path from the virtual node to the second node. This can prevent the packet from being sent to the virtual node.

Optionally, when an SID advertised by the second node is equal to an SID of the first node, the first node may determine the information about the loop-free path from the first node to the second node, and corresponding processing may be as follows.

The first node receives the route advertisement information sent by the second node, where the route advertisement information carries the segment identifier SID of the second node. If the SID of the first node is the same as the SID of the second node, the first node determines the information about the loop-free path from the first node to the second node.

During implementation, during networking, the second node sends the route advertisement information to the first node by using a route reflector, where the route advertisement information carries the SID of the second node. After receiving the route advertisement information of the second node, the first node may obtain the SID of the second node by parsing the route advertisement information of the second node. Then, the first node determines whether the SID of the first node is the same as the SID of the second node, and if the SID of the first node is the same as the SID of the second node, the first node may determine the information about the loop-free path from the first node to the second node.

Optionally, when a unique SID of the first node is the same as a unique SID of the second node, the first node and the second node may be virtualized into one virtual node. In addition, a pre-configured path cost corresponding to the unique SID of the first node is set as the cost of the path from the first node to the virtual node, and a pre-configured path cost corresponding to the unique SID of the second node is set as the cost of the path from the second node to the virtual node.

Step 502: When the first node receives a packet to be sent to the third node, if a link from the first node to the third node is faulty, the first node forwards the packet to the second node based on the information about the loop-free path, so as to forward the packet to the third node through the second node.

During implementation, the CE 2 encapsulates an IP address (as a destination IP address) of the CE 1 in a packet (e.g. a data packet) that is to be sent from the CE 2 to the CE 1. The CE 2 first sends the packet to the ASBR 1. The ASBR 1 finds a private routing table of the CE 1 based on a port that receives the packet from the CE 2, then, searches the private routing table for a private network label corresponding to the IP address of the CE 1 to determines that a next hop is the ABR 1, encapsulates the private network label in the packet, then, encapsulates the address of the next hop in the packet, and sends a packet to the ABR 1 (the first node) by using another node in the third area. After receiving the packet, the first node finds that the packet is encapsulated with the address of the first node, deletes the address of the first node, obtains the private network label encapsulated in the packet, then, obtains a next hop the CSG 1 (the third node) corresponding to the private network label in the packet and the destination IP address (the address of the CE 1) in the packet, encapsulates the address of the next hop in the packet in which the address of the first node is deleted, and then sends a packet to the third node. The third node finds that the packet is encapsulated with the address of the third node, obtains the private network label and the destination IP address in the packet, then, finds a next hop (the CE 1) based on the private network label and the destination IP address, then, finds an egress port of the third node connected to the CE 1, and sends the packet to the CE 1. If the link between the first node and the third node is faulty, the first node may use the private network label to search for another next hop, in other words, obtain pre-stored information about a loop-free path from the first node to the second node, and then send the packet to the second node by using the information about the loop-free path. The second node may view the private network label encapsulated in the packet, search for a next hop (the third node) corresponding to the private network label, encapsulate an SID of the third node in the packet that is encapsulated with the private network label, and first send a packet to the CSG 2. The CSG 2 may search a public network routing table and send the packet to the third node. The third node determines that the SID in the packet is the SID of the third node, may obtain the private network label and the destination IP address encapsulated in the packet, delete the private network label, search for a next hop (the CE 1) in the private network routing table, then, determine the egress port of the third node connected to the CE 1, and send the packet to the CE 1 through the egress port. In this way, the packet is first sent to the third node, and then sent to the CE 1.

In addition, when the first node determines that the link to the third node is faulty, the first node may delete a private network routing table in which a next hop is the third node.

Optionally, the first node may encapsulate the information about the loop-free path in the packet for forwarding, and corresponding processing may be as follows.

The first node encapsulates the information about the loop-free path in a header of a packet, and the first node forwards the packet encapsulated with the information about the loop-free path to the second node.

During implementation, the ABR 1 may encapsulate the information about the loop-free path in a header of the packet encapsulated with the private network label, and then the first node may forward the packet encapsulated with the information about the loop-free path to the second node. For example, as shown in FIG. 8, the information about the loop-free path includes: an SID of the ASG 1—an SID of the ASG 2—an SID of the ABR 2, where the SID of the ASG 1 is 78, the SID of the ASG 2 is 88, and the SID of the ABR 2 is 68. A sending process is as follows: The ABR 1 sends the packet encapsulated with 78, 88, and 68 to the ASG 1. The ASG 1 deletes the SID of the ASG 1 after determining that the packet includes the SID of the ASG 1, and then sends a packet encapsulated with 88 and 68 to the ASG 2. The ASG 2 deletes the SID of the ASG 2 after determining that the packet includes the SID of the ASG 2, and sends a packet encapsulated with 68 to the ABR 2. In this way, the packet can be sent to the ABR 2.

Optionally, when the information about the loop-free path from the first node to the second node is the secondary routing information, corresponding processing in step 502 may be as follows.

When the first node receives the packet to be sent to the third node, if the link from the first node to the third node is faulty, and the direct link between the first node and the second node is faulty, the first node forwards the packet to the second node based on the information about the loop-free path.

During implementation, it can be known from the foregoing description that, the packet sent by the CE 2 to the CE 1 passes through the first node (the ABR 1). The first node finds that the next hop corresponding to the private network label in the packet is the third node (the CSG 1), and may send the packet encapsulated with the private network label to the third node. The third node sends the packet to the CE 1. However, the first node determines that the link to the third node is faulty. Therefore, the first node may use the private network label to search for another address whose next hop is the second node. However, the direct link between the first node and the second node is faulty. The first node may obtain stored secondary routing information of another next hop, in other words, obtain the pre-stored loop-free path information, and then send the packet to the second node by using the pre-stored loop-free path information. The second node may view the private network label and the destination address encapsulated in the packet, search for a next hop the third node corresponding to the private network label and the destination address, encapsulate the SID of the third node in the packet encapsulated with the private network label, and first send a packet to the CSG 2. The CSG 2 may search the public network routing table, and send the packet to the third node. The third node checks that the SID in the packet is the SID of the third node, may obtain the private network label and the destination address in the packet, delete the private network label, and send a packet to the CE 1 based on the private network label and the destination address. In this way, the packet is first sent to the third node, and then sent to the CE 1.

It should be noted that the SID mentioned in this embodiment of the present application may be, for example, a prefix segment identifier (prefix SID).

According to the foregoing description, when the second node has a packet to be sent to the first node, the second node may also determine information about a loop-free path from the second node to the first node, and send the packet to the first node by using the information about the loop-free path. A processing process is similar to the foregoing process.

In this embodiment of the present application, when the first node and the second node are the pair of nodes having an anycast route, the first node may send the packet to the second node by using the information about the loop-free path from the first node to the second node, so that a loop is not formed when the packet is sent between the nodes having an anycast route. This improves a success rate of packet sending.

In another embodiment of the present application, as shown in FIG. 9a, a network includes two areas: a first area and a second area, where the first area is adjacent to the second area, the first area is an IGP area, the second area is a BGP area, and both the first area and the second area are public network areas. In the first area, there are two CSGs and two ASBRs, that is, a CSG 1, a CSG 2, an ASBR 1, and an ASBR 2. There is a link between the CSG 1 and each of the CSG 2 and the ASBR 1, there is a link between the CSG 2 and the ASBR 2, and there is a link between the ASBR 1 and the ASBR 2. In the second area, there is one ASBR, that is, an ASBR 3, and there is a link between the ASBR 3 and each of the ASBR 1 and the ASBR 2.

In this embodiment of the present application, a solution is described in detail by using an example in which a first node is the ASBR 1, a second node is the ASBR 2, and a third node is the ASBR 3. In this embodiment, the first node and the second node may not be a pair of anycast nodes during networking. When route advertisement information is advertised, because both the first node and the second node are connected to the third node, and both the first node and the second node can learn of an IP address of the third node, which indicates that a packet of each of the first node and the second node can be forwarded to the third node, the first node and the second node may be considered as a pair of nodes having an anycast route.

Before implementation, when routing information is non-statically configured, a process of establishing a routing table in the CSG 1, the ASBR 1, and the ASBR 2 is first described. The ASBR 3 sends the IP address of the ASBR 3 to the ASBR 1 and the ASBR 2 by using a BGP. After receiving the IP address of the ASBR 3, the ASBR 1 and ASBR 2 may store a public network routing table, where the public network routing table includes the IP address and an egress port of the ASBR 3. In addition, the ASBR 2 may send the IP address of the ASBR 3 to the ASBR 1 by using an IGP. The ASBR 1 may record the public network routing table, where the public network routing table includes the IP address and the egress port of the ASBR 3. The ASBR 1 may send the IP address of the ASBR 3 to the ASBR 2 by using the IGP. The ASBR 1 may record the public network routing table, where the public network routing table includes the IP address and the egress port of the ASBR 3. Then, the ASBR 1 may import the IP address of the ASBR 3 into the first area by using the IGP, the CSG 1 in the first area may record the public network routing table, where the public network routing table includes the IP address and the egress port of the ASBR 3.

Figure 9B:
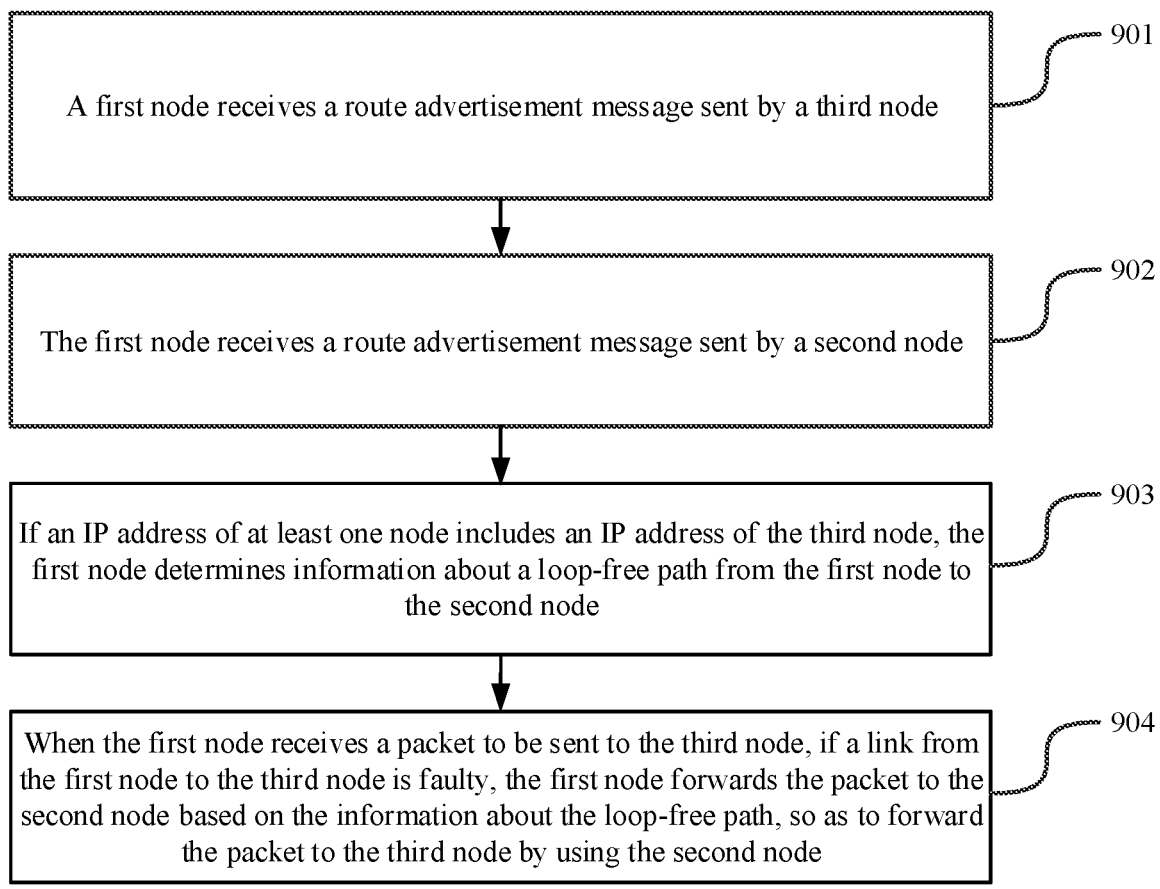
FIG. 9b is a schematic flowchart of a packet forwarding method according to an embodiment of the present application.

As shown in FIG. 9b, a processing procedure of a packet forwarding method may be as follows.

Step 901: The first node receives a route advertisement message sent by the third node.

During implementation, during networking, the first node may receive the route advertisement information advertised by the third node by using the BGP, and obtain the IP address of the third node by parsing the route advertisement information. The first node may record a public network routing table, where in the public network routing table, a destination address is the address of the third node, and a next hop is the third node. In this way, the routing information of the third node is imported to an IGP area in which the first node is located. Then, the first node may advertise the route advertisement information in the first area by using the IGP, so that a node in the first area learns of the routing information of the third node.

In addition, during networking, the second node may receive route advertisement information advertised by the third node by using the BGP, and obtain the IP address of the third node by parsing the route advertisement information. The second node may record a public network routing table, where in the public network routing table, a destination address is the address of the third node, and a next hop is the third node. The second node may send, to the first node, the IP address of the third node learned by the second node and another learned IP address.

Step 902: The first node receives a route advertisement message sent by the second node.

During implementation, the first node may receive the route advertisement message of the second node, and the first node may obtain, by parsing the route advertisement message of the second node, at least one IP address learned by the second node.

Step 903: If an IP address of at least one node includes the IP address of the third node, the first node determines information about a loop-free path from the first node to the second node.

Figure 10:
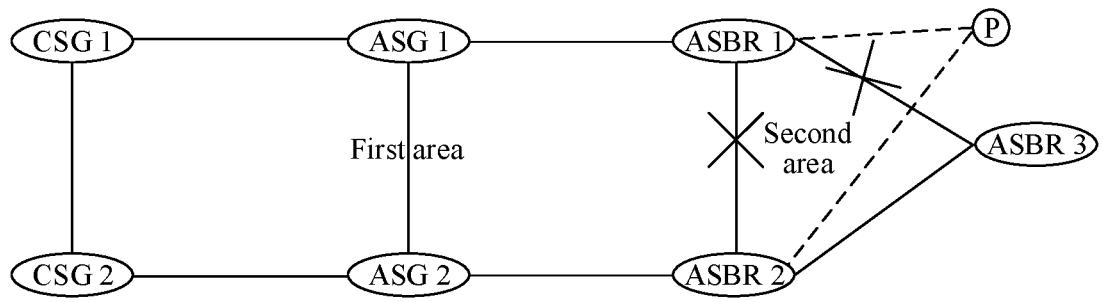
FIG. 10 is a schematic diagram of a virtual node according to an embodiment of the present application.

In an implementation, the first node may determine whether the IP address of the at least one node includes the address of the third node. If the IP address of the at least one node includes the IP address of the third node, the first node may form the addresses of the third node learned by the first node and the second node into a pair of addresses having an anycast route, in other words, the first node and the second node become a pair of nodes having an anycast route. Then, the first node may add a virtual node to network topology information that is of the first area and that is stored by the first node. An address of the virtual node is the address of the third node learned by the first node and the second node. In addition, the first node constructs, in the network topology information, a virtual link from the virtual node to the first node and a virtual link from the first node to the virtual node, and constructs, in the network topology information, a virtual link from the virtual node to the second node and a virtual link from the second node to the virtual node. As shown in FIG. 10, P is a virtual node, the first node is the ASBR 1, the second node is the ASBR 2, P is the virtual node, a link between the ASBR 1 and P is a virtual link and is represented by a dashed line, a link between the ASBR 2 and P is a virtual link and is also represented by a dashed line, and a link between other nodes is an actual link and is represented by a solid line.

Then, the first node may input, into an LT-LFA algorithm, the first node used as a start node, the second node used as a destination node, and network topology information added with the virtual node, to obtain the information about the loop-free path from the first node to the second node.

It should be noted that, in IGP network topology information, the first node sets the address that is learned from the third node by the first node and the second node to the address of the virtual node. This is equivalent to that in the IGP network topology information, only the virtual node advertises the address of the third node.

In addition, the first node may set, as a cost of the path from the first node to the virtual node, a pre-configured path cost corresponding to the IP address that is advertised by the third node and received by the first node, and the first node may set, as a cost of the path from the second node to the virtual node, a pre-configured path cost corresponding to the IP address that is advertised by the third node and advertised by the second node. In addition, the cost of the path from the virtual node to the first node may be set to a preset value greater than a preset threshold, and the cost of the path from the virtual node to the second node may be set to a preset value greater than the preset threshold.

Step 904: When the first node receives a packet to be sent to the third node, if a link from the first node to the third node is faulty, the first node forwards the packet to the second node based on the information about the loop-free path, so as to forward the packet to the third node through the second node.

During implementation, for a packet sent by the CSG 1 to the third node (the ASBR 3), the CSG 1 may search the public network routing table based on the address of the third node to obtain the egress port, and then forward the packet to the first node by using a node in the first area. After receiving the packet, the first node may decapsulate the packet to obtain a destination address (the address of the third node), and then search the public network routing table based on the address of the third node to obtain the egress port. However, the link from the first node to the third node is faulty. Therefore, the first node obtains the information about the loop-free path from the first node to the second node. Then, the first node encapsulates the information about the loop-free path in the packet, and forwards a packet to the second node. The second node determines that the packet has an address of the second node, may obtain the destination address of the packet, then, searches the public network routing table to obtain the egress port, and sends the packet to the third node through the egress port.

Figure 11:
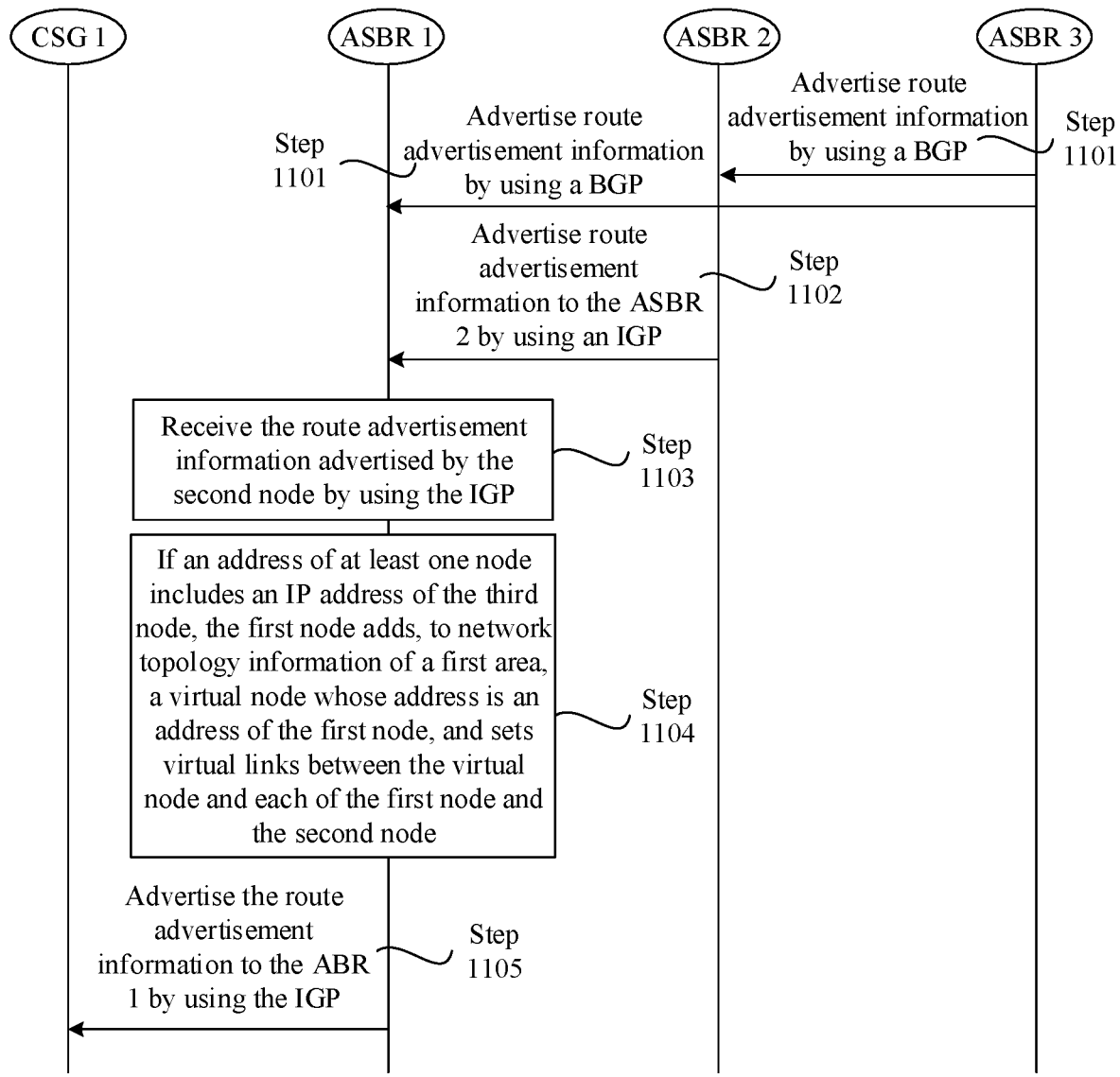
FIG. 11 is a schematic diagram of creating a virtual node according to an embodiment of the present application.

In addition, as shown in FIG. 11, in this embodiment of the present application, for ease of understanding, a signaling flowchart is further provided.

Step 1101: The third node (for example, the ASBR 3) separately advertises route advertisement information (for example, the IP address or an IP prefix of the ASBR 3) to the first node (for example, the ASBR 1) and the second node (for example, the ASBR 2) by using the BGP.

Step 1102: The second node advertises route advertisement information to the first node by using the IGP, where the route advertisement information carries the learned IP address (for example, including the IP address or the IP prefix of the ASBR 3) of the at least one node.

Step 1103: The first node (for example, the ASBR 1) receives (learns of) the route advertisement information (for example, the IP address or the IP prefix of the ASBR 3) advertised by the second node (for example, the ASBR 2) by using the IGP.

Step 1104: If the address of the at least one node includes the IP address of the third node (for example, the IP address or the IP prefix of the ASBR 3), the first node (for example, the ASBR 1) adds, to network topology information of the first area, a virtual node whose address is the address (for example, the IP address or the IP prefix of the ASBR 3) learned by the first node, and sets the virtual links between the virtual node and each of the first node and the second node.

Step 1105: The first node (for example, the ASBR 1) advertises the route advertisement information to the CSG 1 by using the IGP, so that the CSG 1 learns of the address of the third node. For example, the ASBR 1 advertises the IP address or the IP prefix of the ASBR 3 learned from the BGP to the first area by using an IGP route import function, so that the CSG 1 learns of the IP address or IP prefix of the ASBR 3.

In the foregoing two embodiments, when the link from the first node to the third node is faulty, the first node stores information about a loop-free alternate path from the first node to the second node. Similarly, when a link from the second node to the CSG 2 is faulty, the second node may also store information about a loop-free alternate path from the second node to the first node.

In addition, in this embodiment, the first node may not receive routing information of the first node and the second node. A person skilled in the art may configure static routing information of the third node in the first node, and configure that the second node and the first node are a pair of nodes having an anycast route.

In the embodiments of the present application, when the first node and the second node are the pair of nodes having an anycast route, the first node may send the packet to the second node by using the information about the loop-free path from the first node to the second node, so that a loop is not formed when the packet is sent between the nodes having an anycast route. This improves a success rate of packet sending.

Figure 12:
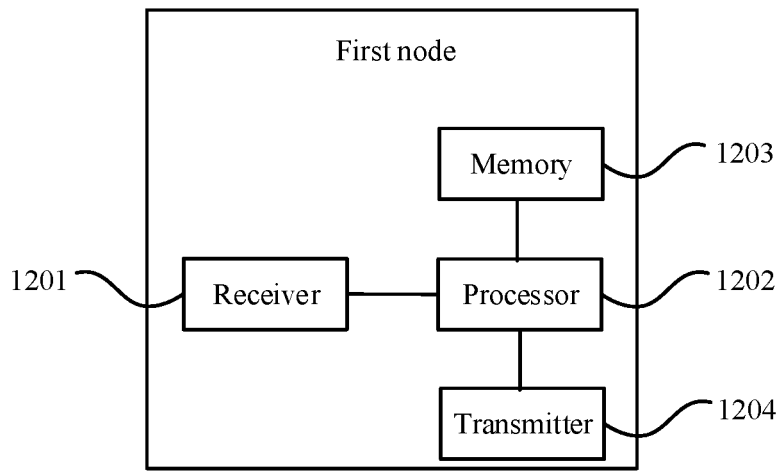
FIG. 12 is a schematic structural diagram of a first node according to an embodiment of the present application.

FIG. 12 is a structural block diagram of a first node according to an embodiment of the present application. The first node may include at least a receiver 1201, a processor 1202, a memory 1203, and a transmitter 1204.

The receiver 1201 may be configured to receive data. In this embodiment of the present application, the receiver 1201 may be specifically configured to perform the following content: receiving route advertisement information sent by a second node, receiving a route advertisement message sent by a third node, and the like.

The transmitter 1204 may be configured to send data. In this embodiment of the present application, the transmitter 1204 may be specifically configured to send a packet and send route advertisement information. Detailed content is as follows: When the first node receives a packet to be sent to the third node, if a link from the first node to the third node is faulty, the transmitter 1204 forwards the packet to the second node based on loop-free path information, so as to forward the packet to the third node through the second node. When the first node receives the packet to be sent to the third node, if the link from the first node to the third node is faulty, and a direct link between the first node and the second node is faulty, the transmitter 1204 forwards the packet to the second node based on the information about the loop-free path. The transmitter 1204 encapsulates the information about the loop-free path in a header of the packet, and forwards a packet encapsulated with the information about the loop-free path to the second node.

The memory 1203 may be configured to store a software program and a module. The processor 1202 may execute various function applications and data processing by running the software program and the module stored in the memory 1203. In this embodiment of the present application, the processor 1202 may be specifically configured to: establish a routing table, search a routing table, add a virtual node to network topology information, determine the information about the loop-free path, and the like. Detailed content is as follows: The processor 1202 is configured to: determine information about a loop-free path from the first node to the second node, where the first node and the second node are a pair of nodes having an anycast route; determine that the information about the loop-free path is information about a primary route from the first node to the second node; if there is the direct link between the first node and the second node, determine that the information about the loop-free path is information about a secondary route from the first node to the second node; add the virtual node to the network topology information, and separately set virtual links between the virtual node and each of the first node and the second node, where an address of the virtual node is the same as an address of the first node; determine the information about the loop-free path from the first node to the second node based on the first node, the virtual node, and network topology information obtained after the virtual node and the virtual links are added; if an SID of the first node is the same as an SID of the second node, determine the information about the loop-free path from the first node to the second node; and if an IP address of at least one node includes an IP address of the third node, determine the information about the loop-free path from the first node to the second node.

The memory 1203 may mainly include a program storage area and a data storage area. In this embodiment of the present application, the memory 1203 may be specifically configured to store a routing table and the like. The program storage area may store an operating system, an application program (such as an interference collection program) required by at least one function, and the like. The data storage area may store data created based on use of the first node, and the like. In addition, the memory 1203 may include a high-speed random access memory, and may further include a non-volatile memory, such as at least one magnetic disk storage device, a flash storage device, or another volatile solid-state storage device. Correspondingly, the memory 1203 may further include a memory controller, to provide the processor 1202, the receiver 1201, and the transmitter 1204 with access to the memory 1203. The processor 1202 is a control center of the first node and is connected to each part of the entire first node by using various interfaces and lines, and performs, by running or executing the software program and/or the module stored in the memory 1203 and invoking the data stored in the memory 1203, various functions of the first node and data processing, so as to perform overall monitoring on the first node.

Optionally, the processor 1202 may include one or more processing cores. Preferably, an application processor and a modem processor may be integrated into the processor 1202, where the application processor mainly processes an operating system, a user interface, an application program, and the like, and the modem processor mainly processes wireless communication. It may be understood that the modem processor may alternatively not be integrated into the processor 1202.

Figure 13:
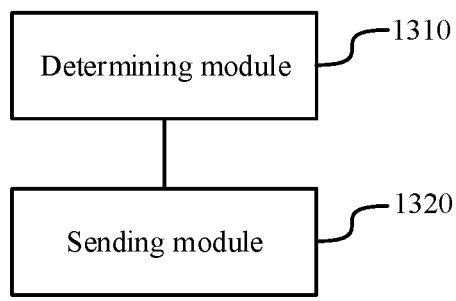
FIG. 13 is a schematic structural diagram of a packet forwarding apparatus according to an embodiment of the present application.

FIG. 13 is a structural diagram of a packet forwarding apparatus according to an embodiment of the present application. The apparatus may be implemented as some or all of a terminal by using software, hardware, or a combination of software and hardware. A terminal provided in an embodiment of the present application may implement the procedures shown in FIG. 5 and FIG. 9 in the embodiments of the present application. The apparatus includes a determining module 1310 and a sending module 1320.

The determining module 1310 is configured to determine information about a loop-free path from a first node to a second node, where the first node and the second node are a pair of nodes having an anycast route. Specifically, the determining module 1310 may implement the determining function in step 501 and another implicit step.

The sending module 1320 is configured to: when the first node receives a packet to be sent to a third node, if a link from the first node to the third node is faulty, forward the packet to the second node based on the information about the loop-free path, so as to forward the packet to the third node through the second node. Specifically, the sending module 1320 may implement the sending function in step 502 and another implicit step.

Optionally, the determining module 1310 is further configured to:

determine that the information about the loop-free path is information about a primary route from the first node to the second node.

Optionally, the determining module 1310 is further configured to:

if there is a direct link between the first node and the second node, determine that the information about the loop-free path is information about a secondary route from the first node to the second node.

The sending module 1320 is configured to:

when the first node receives the packet to be sent to the third node, if the link from the first node to the third node is faulty, and the direct link between the first node and the second node is faulty, forward the packet to the second node based on the information about the loop-free path.

Optionally, the determining module 1310 is configured to:

add a virtual node to network topology information, and separately set virtual links between the virtual node and each of the first node and the second node, where an address of the virtual node is the same as an address of the first node; and determine the information about the loop-free path from the first node to the second node based on the first node, the virtual node, and network topology information obtained after the virtual node and the virtual links are added.

Optionally, the address of the first node includes a first SID and a second SID, an address of the second node includes the first SID and the second SID, a first path cost difference corresponding to the first SID is equal to a second path cost difference corresponding to the second SID, the first path cost difference is a difference at the first SID between a cost of the path from the first node to the virtual node and a cost of the path from the second node to the virtual node, and the second path cost difference is a difference at the second SID between a cost of the path from the first node to the virtual node and a cost of the path from the second node to the virtual node.

Optionally, the cost of the path from the virtual node to the first node and the cost of the path from the virtual node to the second node are preset values greater than a preset threshold.

Figure 14:
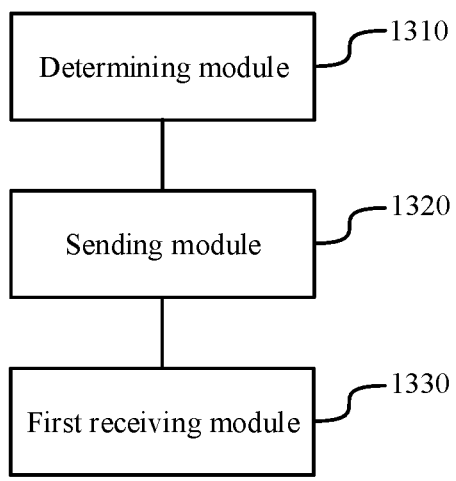
FIG. 14 is a schematic structural diagram of a packet forwarding apparatus according to an embodiment of the present application.

Optionally, as shown in FIG. 14, the apparatus further includes:

a first receiving module 1330, configured to receive route advertisement information sent by the second node, where the route advertisement information carries a segment identifier SID of the second node; and the determining module 1310, configured to:

if an SID of the first node is the same as the SID of the second node, determine the information about the loop-free path from the first node to the second node.

Figure 15:
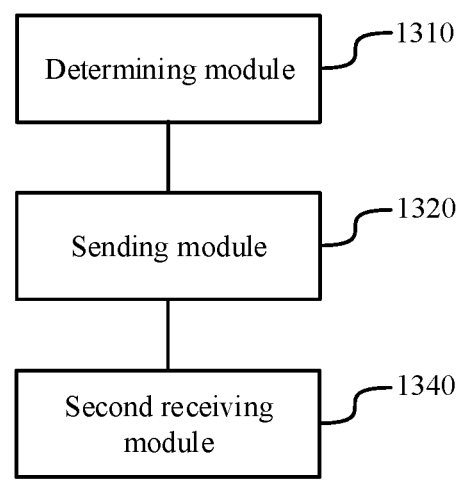
FIG. 15 is a schematic structural diagram of a packet forwarding apparatus according to an embodiment of the present application.

Optionally, as shown in FIG. 15, the apparatus further includes:

a second receiving module 1340, configured to:

receive a route advertisement message sent by the third node, where the route advertisement message carries an IP address of the third node; and receive a route advertisement message sent by the second node, where the route advertisement message carries an IP address that is of at least one node and that is learned by the second node; and the determining module 1310, configured to:

if the IP address of the at least one node includes the IP address of the third node, determine the information about the loop-free path from the first node to the second node.

Optionally, the sending module 1320 is configured to:

encapsulate the information about the loop-free path in a header of the packet; and forward a packet encapsulated with the information about the loop-free path to the second node.

In this embodiment of the present application, when the first node and the second node are the pair of nodes having an anycast route, the first node may send the packet to the second node by using the information about the loop-free path from the first node to the second node, so that no loop is caused when the packet is sent between the nodes having an anycast route. This improves a success rate of packet sending.

It should be noted that division of the foregoing function modules is only described as an example during packet forwarding by the packet forwarding apparatus provided in the foregoing embodiments. In actual application, the foregoing functions may be allocated, based on a requirement, to be implemented by different function modules, to be specific, an internal structure of the device is divided into different function modules to implement all or some of the functions described above. In addition, the packet forwarding apparatus provided in the foregoing embodiments is based on a same inventive concept as the embodiments illustrating the packet forwarding method. For a specific implementation process, refer to the method embodiments. Details are not repeatedly described herein.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on an apparatus, the procedures or functions according to the embodiments of the present application are all or partially generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by an apparatus, or a data storage device, such as a server or a data center, integrating one or more usable media. The usable medium may be a magnetic medium (for example, a floppy disk, a hard disk, a magnetic tape, or the like), an optical medium (for example, a digital video disk (DVD), or the like), a semiconductor medium (for example, a solid-state drive, or the like).

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method, comprising:
    determining, by a first node, information about a loop-free path from the first node to a second node, wherein the first node and the second node are a pair of nodes having an anycast route; and
    forwarding, by the first node, when the first node receives a packet to be sent to a third node and a link from the first node to the third node is faulty, the packet to the third node through the second node, based on the information about the loop-free path, wherein network topology information comprises a virtual node, and an address of the virtual node is the same as an address of the first node, wherein there is a virtual link between the virtual node and the first node, and there is a virtual link between the virtual node and the second node, wherein the determining information about a loop-free path from the first node to a second node comprises:
    determining, by the first node, the information about the loop-free path from the first node to the second node based on the first node, the virtual node, and network topology information obtained after the virtual node and the virtual links are added.

2. The method according to claim 1, wherein after the determining, by a first node, information about a loop-free path from the first node to a second node, the method further comprises:
    determining, by the first node, that the information about the loop-free path is information about a primary route from the first node to the second node.

3. The method according to claim 1, wherein after the determining, by a first node, information about a loop-free path from the first node to a second node, the method further comprises:
    when there is a direct link between the first node and the second node, determining, by the first node, that the information about the loop-free path is information about a secondary route from the first node to the second node; and
    when the first node receives a packet to be sent to a third node, if a link from the first node to the third node is faulty, the first node forwards the packet to the second node based on the information about the loop-free path comprises:
    when the first node receives the packet to be sent to the third node, if the link from the first node to the third node is faulty, and the direct link between the first node and the second node is faulty, forwarding, by the first node, the packet to the second node based on the information about the loop-free path.

4. The method according to claim 1, wherein the address of the first node comprises a first segment identifier (SID) and a second SID, an address of the second node comprises the first SID and the second SID, a first path cost difference corresponding to the first SID is equal to a second path cost difference corresponding to the second SID, the first path cost difference is a difference at the first SID between a cost of the path from the first node to the virtual node and a cost of the path from the second node to the virtual node, and the second path cost difference is a difference at the second SID between a cost of the path from the first node to the virtual node and a cost of the path from the second node to the virtual node.

5. The method according to claim 1, wherein the method further comprises:
    receiving, by the first node, route advertisement information sent by the second node, wherein the route advertisement information carries a SID of the second node; and the determining, by a first node, information about a loop-free path from the first node to a second node comprises:
when an SID of the first node is the same as the SID of the second node, determining, by the first node, the information about the loop-free path from the first node to the second node.

6. The method according to claim 1, wherein the method further comprises:
receiving, by the first node, a route advertisement message sent by the third node, wherein the route advertisement message carries an IP address of the third node; and
receiving, by the first node, a route advertisement message sent by the second node, wherein the route advertisement message carries an IP address that is of at least one node and that is learned by the second node; and
the determining, by a first node, information about a loop-free path from the first node to a second node comprises:
when the IP address of the at least one node comprises the IP address of the third node, determining, by the first node, the information about the loop-free path from the first node to the second node.

7. The method according to claim 1, wherein the forwarding, by the first node, the packet to the second node based on the information about the loop-free path comprises:
forwarding, by the first node, a packet encapsulated with the information about the loop-free path to the second node.

8. A packet forwarding node comprising a processor and a transmitter, wherein:
the processor is configured to determine information about a loop-free path from a first node to a second node, wherein the first node and the second node are a pair of nodes having an anycast route; and
the transmitter is configured to: forward, when the first node receives a packet to be sent to a third node, if a link from the first node to the third node is faulty, the packet to the second node based on the information about the loop-free path, so as to forward the packet to the third node through the second node, wherein network topology information comprises a virtual node, and an address of the virtual node is the same as an address of the first node, wherein there is a virtual link between the virtual node and the first node, and there is a virtual link between the virtual node and the second node, wherein the processor is configured to:
add a virtual node to network topology information, and separately set virtual links between the virtual node and each of the first node and the second node, wherein an address of the virtual node is the same as an address of the first node; and
determine the information about the loop-free path from the first node to the second node based on the first node, the virtual node, and network topology information obtained after the virtual node and the virtual links are added.

9. The node according to claim 8, wherein the processor is further configured to:
determine that the information about the loop-free path is information about a primary route from the first node to the second node.

10. The node according to claim 8, wherein the processor is further configured to:
when there is a direct link between the first node and the second node, determine that the information about the loop-free path is information about a secondary route from the first node to the second node; and
the transmitter is configured to:
when the first node receives the packet to be sent to the third node, if the link from the first node to the third node is faulty, and the direct link between the first node and the second node is faulty, forward the packet to the second node based on the information about the loop-free path.

11. The node according to claim 8, wherein an address of the first node comprises a first segment identifier (SID) and a second SID, an address of the second node comprises the first SID and the second SID, a first path cost difference corresponding to the first SID is equal to a second path cost difference corresponding to the second SID, the first path cost difference is a difference at the first SID between a cost of the path from the first node to the virtual node and a cost of the path from the second node to the virtual node, and the second path cost difference is a difference at the second SID between a cost of the path from the first node to the virtual node and a cost of the path from the second node to the virtual node.

12. The node according to claim 8, wherein the node further comprises a receiver and the receiver is further configured to:
receive route advertisement information sent by the second node, wherein the route advertisement information carries a segment identifier SID of the second node; and
the processor is configured to:
when an SID of the first node is the same as the SID of the second node, determine the information about the loop-free path from the first node to the second node.

13. The node according to claim 8, wherein the node further comprises a receiver and the receiver is configured to:
receive a route advertisement message sent by the third node, wherein the route advertisement message carries an IP address of the third node; and
receive a route advertisement message sent by the second node, wherein the route advertisement message carries an IP address that is of at least one node and that is learned by the second node; and
the processor is configured to:
hen the IP address of the at least one node comprises the IP address of the third node, determine the information about the loop-free path from the first node to the second node.

14. The node according to claim 8, wherein the transmitter is configured to:
forward a packet encapsulated with the information about the loop-free path to the second node.

15. A non-transitory computer-readable storage medium, wherein the computer-readable storage medium stores instructions, and when the computer-readable storage medium instructions are executed on a first node, the first node is enabled to perform steps comprising:
determining, by the first node, information about a loop-free path from the first node to a second node, wherein the first node and the second node are a pair of nodes having an anycast route; and
forwarding, by the first node, when the first node receives a packet to be sent to a third node and a link from the first node to the third node is faulty, the packet to the third node through the second node, based on the information about the loop-free path, wherein network topology information comprises a virtual node, and an address of the virtual node is the same as an address of the first node, wherein there is a virtual link between the virtual node and the first node, and there is a virtual link between the virtual node and the second node, wherein the determining information about a loop-free path from the first node to a second node comprises: determining, by the first node, the information about the loop-free path from the first node to the second node based on the first node, the virtual node, and network topology information obtained after the virtual node and the virtual links are added.

* * * * *